(12) United States Patent
Schöttke et al.

(10) Patent No.: US 11,053,106 B2
(45) Date of Patent: Jul. 6, 2021

(54) BATTERY LOCK

(71) Applicant: JUNGHEINRICH AKTIENGESELLSCHAFT, Hamburg (DE)

(72) Inventors: Carsten Schöttke, Moosburg (DE); Hubert Bibernell, Landshut (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 36 days.

(21) Appl. No.: 16/267,724

(22) Filed: Feb. 5, 2019

(65) Prior Publication Data
US 2019/0241416 A1 Aug. 8, 2019

(30) Foreign Application Priority Data
Feb. 7, 2018 (DE) ...................... 10 2018 201 892.8

(51) Int. Cl.
*B60K 1/00* (2006.01)
*B66F 9/075* (2006.01)
*B60K 1/04* (2019.01)

(52) U.S. Cl.
CPC ............ *B66F 9/07536* (2013.01); *B60K 1/04* (2013.01); *B66F 9/0754* (2013.01); *B60K 2001/0461* (2013.01); *B60K 2001/0494* (2013.01)

(58) Field of Classification Search
CPC ....... B60K 1/04; B66F 9/07536; B66F 9/0754
See application file for complete search history.

(56) References Cited

U.S. PATENT DOCUMENTS 7,398,848 B2 * 7/2008 Kondo ................ B66F 9/07536
 180/68.5
7,455,137 B2 * 11/2008 Magsaam .............. B60J 5/0487
 180/68.5
(Continued)

FOREIGN PATENT DOCUMENTS

DE 19622694 12/1997
DE 10159555 A1 6/2003
(Continued)

OTHER PUBLICATIONS

European Application No. EP19151356.3, "Extended European Search Report", dated Jun. 28, 2019, 48 pages.
(Continued)

*Primary Examiner* — Hau V Phan
(74) *Attorney, Agent, or Firm* — Kilpatrick Townsend & Stockton LLP

(57) ABSTRACT

The invention relates to an electrically powered industrial truck, in particular a narrow aisle forklift truck, comprising a battery box for housing a battery block, which box is open on at least one side for removing the battery block in the width direction of the vehicle and comprises on its top face a strut extending substantially in the longitudinal direction of the vehicle, and at least one locking device for the battery block housed in a battery box, wherein the at least one locking device comprises a mount associated with the strut, a pivot shaft, which extends above the battery box in the width direction of the industrial truck and is pivotally held by the mount, and a pivot lever, which is carried by the pivot shaft and is pivotable between a locking position and a releasing position, wherein the pivot lever is designed, when in its locking position, to support the battery block in the width direction of the vehicle and, when in its releasing
(Continued)

position, to release the battery block in the width direction of the vehicle.

13 Claims, 3 Drawing Sheets

(56) References Cited

U.S. PATENT DOCUMENTS

| | | | | |
|---|---|---|---|---|
| 7,984,779 | B2* | 7/2011 | Boegelein | B60K 1/04 180/68.5 |
| 8,356,684 | B2* | 1/2013 | Boegelein | B60K 1/04 180/68.5 |
| 2002/0066609 | A1* | 6/2002 | Dignitti | B60R 16/04 180/68.5 |
| 2008/0314662 | A1 | 12/2008 | Bogelein et al. | |
| 2010/0018791 | A1 | 1/2010 | Kunkel et al. | |
| 2010/0147612 | A1* | 6/2010 | Murase | B60K 1/04 180/68.5 |
| 2010/0300784 | A1 | 12/2010 | Bergmeier et al. | |

FOREIGN PATENT DOCUMENTS

| | | |
|---|---|---|
| DE | 102007028862 | 12/2008 |
| DE | 102007057801 | 6/2009 |
| DE | 102008034782 | 1/2010 |
| DE | 102013106594 | 1/2015 |
| DE | 102016113154 | 1/2018 |
| EP | 3272700 A1 | 1/2018 |
| JP | S59105298 U | 7/1984 |
| JP | 04067562 A | 3/1992 |
| JP | H0467562 A | 3/1992 |

OTHER PUBLICATIONS

German Application No. 10 2018 201 892.8 , "Search Report", dated Jan. 18, 2019, 8 pages.
European Patent Application No. EP19151356, European Search Report dated Jun. 28, 2019, 7 pages.

* cited by examiner

BATTERY LOCK

CROSS-REFERENCE TO RELATED APPLICATIONS

This application claims priority to German Patent Application No. 10 2018 201 892.8, filed in Germany on Feb. 7, 2018, the entire contents of which are hereby incorporated herein by this reference.

TECHNICAL FIELD

The present invention relates to an electrically powered industrial truck, in particular a narrow aisle forklift truck, comprising a battery box for housing a battery block, which box is open on at least one side for removing the battery block in the width direction of the vehicle and comprises on its top face a strut extending substantially in the longitudinal direction of the vehicle, and at least one locking device for a battery block housed in the battery box.

BACKGROUND

Electrically powered industrial trucks equipped with a battery block for powering at least one electrically powered traction motor are used, inter alia, in areas in which local emissions have to be ruled out, for example due to clean air regulations, and so vehicles having internal combustion engines are out of the question. Such areas may include, for example, roofed logistics facilities, such as racked warehouses, in which the racks are positioned as close together as possible to make better use of the available installation space, only leaving what are referred to as narrow aisles therebetween. Due to the size of these narrow aisles, industrial trucks moving in such facilities are also restricted in terms of their design and in particular their dimensions in the width direction with respect to their main movement direction.

However, unlike with vehicles having internal combustion engines, which can be refuelled within a few minutes, in electrically powered vehicles the problem constantly arises whereby the battery block generally requires many hours to become fully charged, during which time the vehicle is accordingly unfit for use. However, in the case of the above-described industrial trucks for logistics facilities, in which shift work is often used, downtimes of this kind are unacceptable.

To solve this problem, a known alternative involves not permanently installing the battery block in the industrial truck, but instead arranging it in the industrial truck in a removable or interchangeable manner. This measure means it is no longer necessary to take the entire vehicle out of use for several hours during a charging cycle of the battery block, but rather said block can be charged outside the vehicle and then replace a run-down battery block in the industrial truck.

A run-down battery block is generally swapped for an externally charged block in this manner by means of a lifting device, e.g. a low-platform truck, using which the battery block inserted in the industrial truck can be removed. To enable the swapping processes for battery blocks in industrial trucks of this kind and, on the other hand, to hold the battery blocks securely in the vehicle when in travel mode, various devices are used to allow the battery block to be releasably locked in its battery box in the industrial truck.

One example of a locking device of this kind from the prior art is illustrated in FIG. 1, which shows a portion of a known industrial truck 10 comprising a battery box 12 that is arranged between the two axles of the industrial truck 10 and is accessible from the side. In the illustration shown in FIG. 1, a battery block 14 is housed in said battery box 12, and the battery box 12 is enclosed on four sides by the frame of the industrial truck 10.

The battery box 12 is open externally only in the width direction of the industrial truck 10, and so in the industrial truck shown in FIG. 1 the battery block 14 is removed in the width direction of the industrial truck 10. In addition, FIG. 1 shows a locking device 20, which can be stuck down or locked in the region of the opening of the battery box 12 on a lower and an upper frame part of the industrial truck 10 by means of a manually operated lever device 22. The locking device 20 thus spans the opening of the battery box 12 and holds the battery block 14 in its intended position when the industrial truck 10 is in travel mode.

However, the view from FIG. 1 already shows the drawbacks of the locking device 20 from the prior art. Firstly, since the device 20 must be stuck down to the vehicle frame, releasing the device 20 in order to remove the battery block 14 is laborious and time-consuming, and in particular so too is attaching the locking device 20 to the industrial truck 10. Additionally, the locking device 20 takes up a considerable amount of installation space in the width direction of the vehicle 10, to the detriment of the maximum possible design width of the battery block 14. However, since a maximum capacity of the battery block 14 is always the aim and this capacity practically linearly correlates with said volume, potential capacity of the battery block 14 is ultimately also lost due to the design width of the locking device 20, in particular when the total design width of the vehicle 10 is restricted by external conditions, as in the aforementioned case of a narrow aisle industrial truck. Lastly, the known locking device 20 also requires a relatively large number of components and is therefore expensive to manufacture or purchase.

SUMMARY

According to certain implementations, an electrically powered industrial vehicle, such as a narrow aisle forklift truck, includes a battery box for housing a battery block, and at least one locking device for the battery block that is housed in the battery box. The battery box is open on at least one side for removing the battery block in the width direction of the vehicle. The battery box comprises on its top face a strut. The strut extends substantially in the longitudinal direction of the vehicle. The at least one locking device comprises a mount, a pivot shaft, and a pivot lever. The mount is associated with the strut. The pivot shaft extends above the battery box in the width direction of the vehicle. The pivot shaft is pivotally held by the mount. The pivot lever is carried by the pivot shaft. The pivot lever is pivotable between a locking position and a releasing position. The pivot lever is designed, when in its locking position, to support the battery block in the width direction of the vehicle. The pivot lever is designed, when in its releasing position, to release the battery block in the width direction of the vehicle.

These illustrative implementations are mentioned not to limit or define the disclosure, but to provide examples to aid understanding thereof. Additional implementations are discussed in the Description, and further description is provided there.

BRIEF DESCRIPTION OF THE DRAWINGS

Features, implementations, and advantages of the present disclosure are better understood when the following Description is read with reference to the accompanying drawings, where.

DETAILED DESCRIPTION

Figure 1:
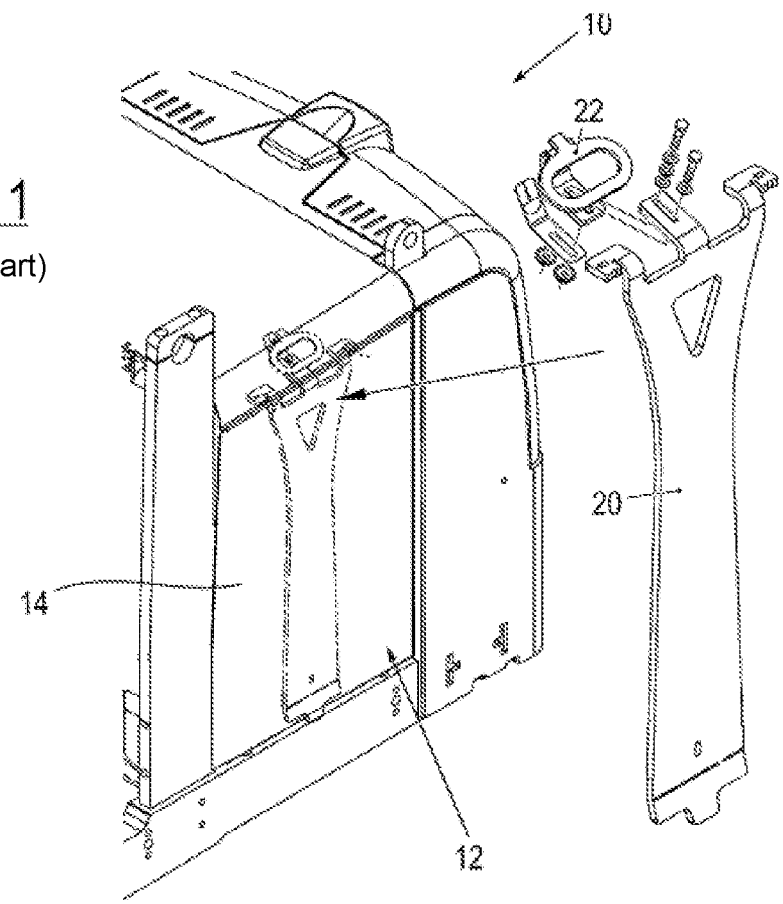
FIG. 1 is a diagram depicting a portion of an electrically powered industrial truck, according to certain implementations.

The present invention provides a generic industrial truck comprising a locking device for the battery block housed in a battery box that an operator can release and lock in an ergonomically advantageous manner, is cost-effective to manufacture and install, has as small a design width as possible, and still holds the battery block reliably in its predetermined position.

At least one locking device of the industrial truck according to the invention comprises a mount associated with a strut, a pivot shaft, which extends above the battery box in the width direction of the industrial truck and is pivotally held by the mount, and a pivot lever, which is carried by the pivot shaft and is pivotable between a locking position and a releasing position, the pivot lever being designed, when in its locking position, to support the battery block and, when in its releasing position, to release the battery block for removal from the industrial truck. In this respect, the axial direction of the pivot shaft is accordingly substantially identical to the removal direction of the battery block.

Due to the design according to the invention of a locking device, an operator can reach and operate said device in a simple manner, the device has a minimum number of components, meaning it is simple to manufacture and is cost-effective, and its compact design also means that the battery block can be designed to be as wide as possible and thus to have a high capacity.

Even though it is possible in principle to design the locking device in such a way that the pivot lever can be held in its predetermined positions merely under the effect of gravity, to ensure the operational safety of the locking device of the industrial truck according to the invention it may be advantageous for said device to further comprise a first clamping device, designed to be able to fix the pivot shaft in at least one pivot position. This pivot position may be either the locking position or the releasing position, for example.

In one development, however, the first clamping device can also be designed to be able to fix the pivot shaft in any pivot position. In any case, the clamping device can act between the pivot shaft and a clamping element by means of a force-fit or frictional fit, the operator in turn being able to switch said element between a releasing state and clamping state.

In one development, the pivot lever can furthermore be carried so as to be axially movable on the pivot shaft or carried so as to be movable together with the pivot shaft in the axial direction of the pivot shaft by means of the mount.

In this way, the pivot lever can be movable with respect to the battery block in the width direction of the industrial truck, such that any potential tolerance can be compensated for by moving the lever with respect to the battery block and the battery block is thus not left with any movement play in its intended working position. Any change to the centre of gravity of the vehicle during its travel due to the battery block slipping can thus be reliably ruled out.

In this context, a second clamping device can also be provided, which is designed to be able to fix the pivot lever in at least one position in the axial direction of the pivot shaft with respect to the mount. Alternatively, however, it could also be conceivable to provide a resilient element that preloads the pivot lever in a suitable direction, meaning that fixing in place is not absolutely necessary.

In a particularly advantageous and simple embodiment, the first clamping device and the second clamping device are formed by a single joint clamping device; for example, in the case where the pivot lever is rigidly attached to the pivot shaft and can be moved together therewith with respect to the mount, it is possible to provide a joint clamping device that fixes the pivot shaft in place in terms of both an axial movement with respect to the mount and an angular movement.

Alternatively or additionally, the mount can furthermore be designed to limit the pivot range of the pivot lever in at least one pivot direction. For example, in the releasing position of the pivot lever, it may be conceivable to provide a system that holds the pivot lever in a stable state but does not require any fixing in position.

Since it is advantageous both in general and for design reasons for the at least one opening of the battery box to be arranged to the side in relation to the main movement direction of the industrial truck, according to the invention the removal direction is oriented in the width direction of the industrial truck. In particular, the battery box can comprise an opening in two opposite faces for removing the battery block in the width direction of the vehicle, it being possible for at least one locking device to be assigned to each of the two openings. This increases the flexibility of the industrial truck according to the invention since it is possible to remove the battery block from both sides, and so in some circumstances it may not be necessary to carry out complex maneuvering operations prior to removal.

Furthermore, rollers can be provided on a bottom surface of the battery box in the industrial truck according to the invention, on which rollers the battery block rests and which accordingly simplify removal of the battery block from the battery box.

In addition, the industrial truck according to the invention can further comprise a removable cover element that defines the at least one opening of the battery box in the width direction of the industrial truck, it being possible to arrange the at least one locking device within the cover element.

Lastly, in the at least one locking device, the pivot lever can be mounted on the pivot shaft by means of a threaded attachment (transmission thread, steep-lead-angle thread) so that, in travel mode, any adjustments to the clamping region in the width direction of the vehicle can be compensated for by the pivot lever pivoting downwards under the effect of gravity. In this case, during the locking, the operator must fix the pivot lever in place at an angle of at most 80° to the theoretical end position.

Figure 2A:
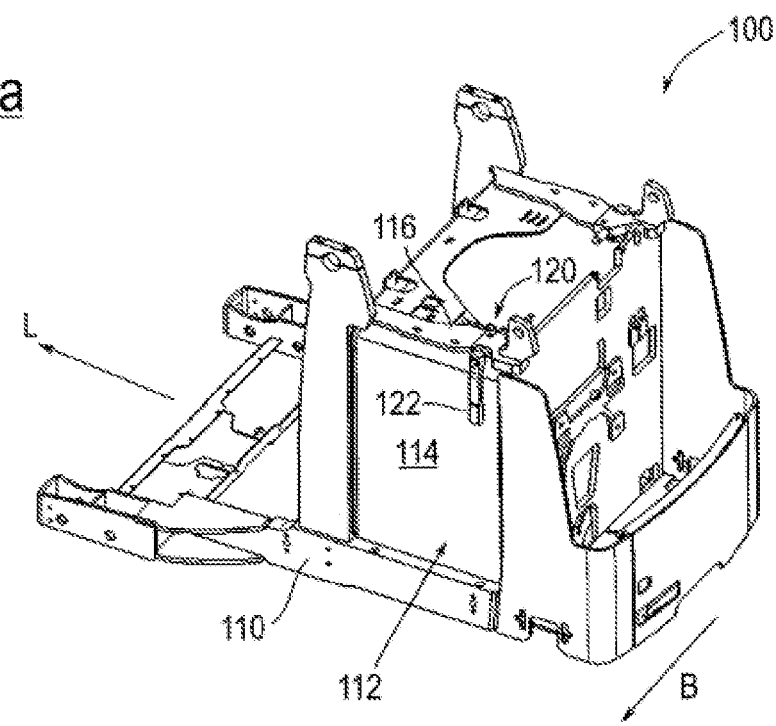
FIGS. 2a and 2b are diagrams depicting views of a portion of an electrically powered industrial truck, according to certain implementations.
Figure 2B:
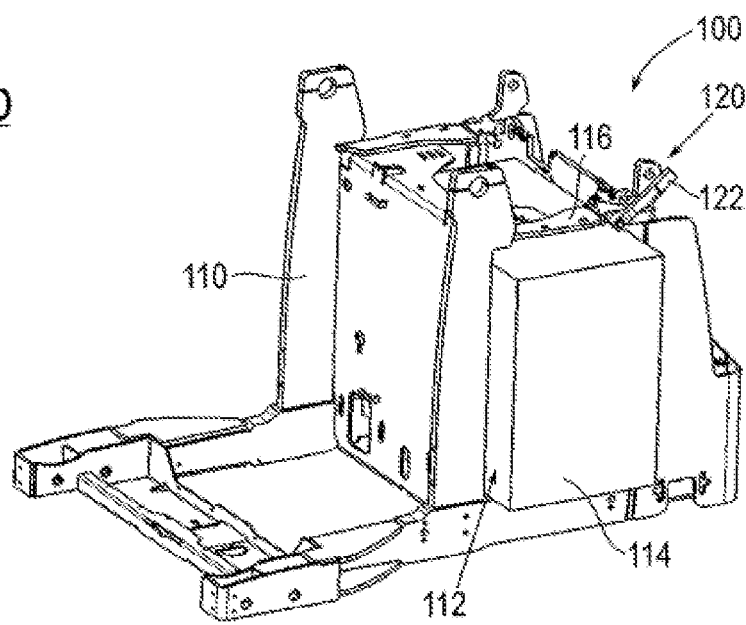

FIGS. 2a and 2b each show a portion of an industrial truck 100 according to the invention comprising a vehicle frame 110; for reasons of clarity, only the components of the industrial truck 100 relevant for the present invention have been shown and, for example, no wheels, driver's stand or mast have been shown.

The industrial truck 100 is in the form of what is known as a narrow aisle forklift truck and is intended to move between narrowly spaced rows of shelves in roofed logistics facilities mainly in its forward or longitudinal direction L. For this purpose, the industrial truck 100 has relatively compact dimensions in its width direction B, which are adapted to the distances between the rows of shelves and cannot be exceeded by any add-on parts or components of the industrial truck 100 when in travel mode.

Traction motors (not shown in FIGS. 2a and 2b) supplied with electrical energy from the battery block 114 housed in the battery box 112 are responsible for propelling the industrial truck 100. In this case, the battery box 112 is enclosed on four sides by the vehicle frame 110, a strut 116, inter alia, being provided on top of said box and extending in the longitudinal direction L of the industrial truck 110.

By arranging the battery block 114 at the indicated position in the vehicle frame 110 of the industrial truck 100, said block acts as part of the counterbalance of the industrial truck 110, provided to counteract tilting moments on the industrial truck 110 produced by loads borne by the mast (not shown).

For the battery block 114 to have as high a capacity as possible in order to operate the industrial truck 100 for as long as possible without completely running down, the battery block 114 is designed having dimensions that substantially correspond to the external dimensions of the industrial truck 100 in the width direction B thereof. A cover (not shown in FIGS. 2a and 2b) releasably attached to the vehicle frame 110 can merely be provided for covering the battery box 112 in the width direction B during operation of the industrial truck 100 and to terminate the outer contour of the industrial truck 100.

To reduce the downtimes of the industrial truck 100 when the battery block 114 has run down, said block is arranged so as to be removable from the battery box 112 so that it can be replaced as necessary with another, externally charged battery block. For this purpose, rollers are provided at the bottom of the battery box 112, on which rollers the battery block 114 can rest and which allow the battery block 114 to roll off in the width direction B of the industrial truck 100 in order to be removed or inserted.

For the battery block 114 to be held at its intended position in the battery box 112 when the industrial truck 100 is in travel mode and to prevent it rolling off on the rollers at the bottom of the battery box 112 in an undesirable manner, for example due to centrifugal force when the truck travels around a corner, a locking device 120 is also shown on the strut 116 above the battery box 112, said device allowing the battery block 114 to be locked for the travel mode of the industrial truck 100 and also allowing the battery block 114 to be released in order to be removed. In this case, only the pivot lever 122 of the locking device 120 is shown in FIGS. 2a and 2b; in FIG. 2a, said lever is in its locking position, in which it supports the battery block 114 externally in the width direction B of the industrial truck 100, and in FIG. 2b, said lever is in its releasing position, in which it is pivoted out of the region of the battery block 114 and the battery block 114 can thus be removed from the battery box 112 in the width direction B.

Figure 4:
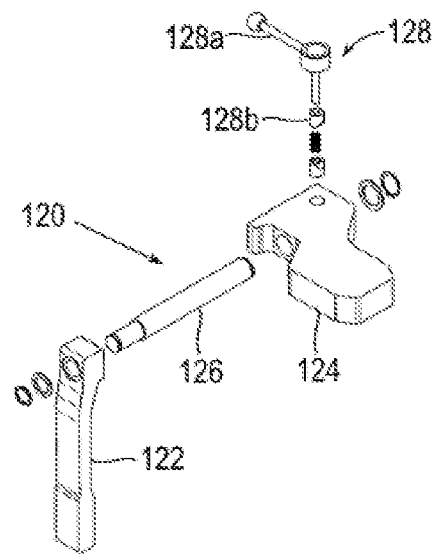
FIG. 4 is a diagram depicting an exploded view of a locking device of an industrial truck, according to certain implementations.
Figure 3A:
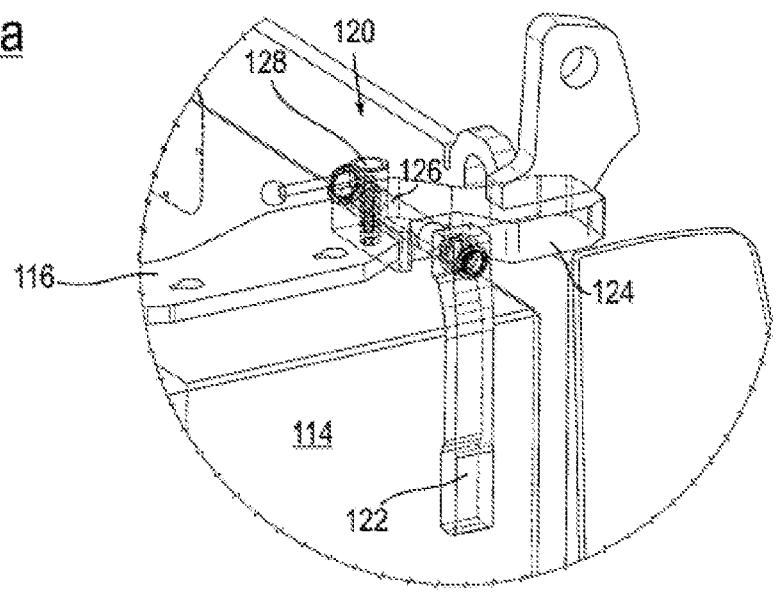
FIGS. 3a and 3b are diagrams depicting views of a locking device of an industrial truck, according to certain implementations.
Figure 3B:
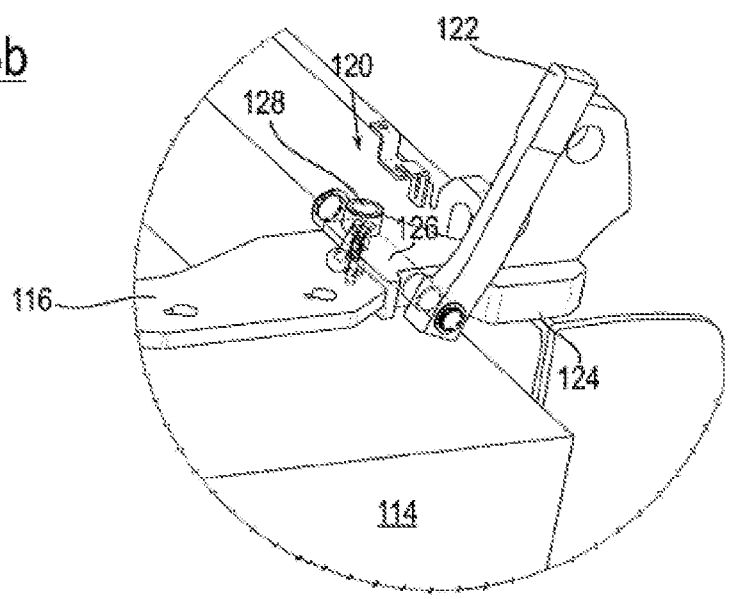

To aid understanding, the locking device 120 is shown again in FIGS. 3a, 3b and 4 in an enlarged view; FIG. 3a again shows the locking position of the pivot lever 122 on the industrial truck 100, FIG. 3b shows the releasing position thereof, and in FIG. 4 the locking device 120 is shown in an exploded view.

In addition to the aforementioned pivot lever 122 that supports the battery block in its locking position, the locking device 120 further comprises a mount 124, a pivot shaft 126, to which the pivot lever 122 can be attached in a non-rotatable and stationary manner, and a clamping device 128.

As can best be seen in FIGS. 3a and 3b, the mount 124 is associated with the strut 116 and supports the pivot shaft 126 in such a way that the axial direction thereof extends in the width direction B of the industrial truck 110 above the battery box 112. Furthermore, the pivot shaft 126 can be moved together with the pivot lever 122 by a certain amount in its axial direction with respect to the mount 124, and so to transfer the pivot lever from the locking position from FIG. 3a to the releasing position from FIG. 3b, the pivot lever 122 must first be manually withdrawn in the width direction B of the industrial truck 100 and then the pivot lever 122 must be pivoted by around 180° clockwise in order to pivot the pivot lever out of the region of the battery block 114 and release said block for the purpose of removal. Conversely, to lock the battery block 114 in the battery box 112, the pivot lever 122 must first be pivoted downwards and then pushed inwards in the width direction B to abut the battery block 114, in order to fix the battery block 114 in its operating position with zero play.

Lastly, the locking device 120 also comprises the clamping device 128, by means of which the pivot shaft 126 and thus the pivot lever 122 can be fixed in any axial and angular positions. To do so, the operator can grip and rotate the lever element 128a of the clamping device in order to engage the clamping jaw element 128b with the pivot shaft 126 so as to clamp said shaft in its current position or to disengage it from the pivot shaft 126 so as to release it. The clamping device 128 thus corresponds to a single clamping device according to the invention that fulfils the role of both the first and second clamping device of fixing the pivot lever 122 in place in terms of its angular and axial positions, respectively.

Although the embodiment shown provides for manual actuation of the locking device 120, which can be carried out comfortably by the operator by way of the ergonomically advantageous positioning of the device 120, automatic or semi-automatic actuation could also be provided instead, in which the pivot lever is pivoted and/or the pivot shaft is fixed in place or released by means of controlled actuators.

The invention claimed is:

1. An electrically powered industrial vehicle comprising:
    a battery box for housing a battery block, the battery box being open on at least one side for removing the battery block in a width direction of the vehicle, wherein a top face of the battery box comprises a strut extending substantially in a longitudinal direction of the vehicle, and
    at least one locking device for the battery block housed in the battery box;
    wherein the at least one locking device comprises:
        a mount associated with the strut;
        a pivot shaft, which extends above the battery box in the width direction of the vehicle and is pivotally held by the mount;
        a first clamping device, which is configured to engage a clamping jaw with the pivot shaft to clamp the pivot shaft in at least one pivot position; and
        a pivot lever, which is carried by the pivot shaft and is pivotable between a locking position and a releasing position, the pivot lever being designed, when in the locking position, to support the battery block in the width direction of the vehicle and, when in the releasing position, to release the battery block in the width direction of the vehicle.

2. The electrically powered industrial vehicle according to claim 1, wherein the first clamping device is designed to be able to clamp the pivot shaft in any pivot position.

3. The electrically powered industrial vehicle according to claim 2, wherein the first clamping device and a second clamping device are formed by a single joint clamping device in the at least one locking device.

4. The electrically powered industrial vehicle according to claim 1, wherein the pivot lever is further carried so as to be axially movable on the pivot shaft or is carried so as to be movable together with the pivot shaft in the width direction of the vehicle with respect to the mount.

5. The electrically powered industrial vehicle according to claim 4, wherein the at least one locking device further comprises a second clamping device, which is designed to be able to clamp the pivot lever in at least one position in relation to the width direction of the vehicle.

6. The electrically powered industrial vehicle according to claim 5, wherein the first clamping device and the second clamping device are formed by a single joint clamping device in the at least one locking device.

7. The electrically powered industrial vehicle according to claim 1, wherein the first clamping device and a second clamping device are formed by a single joint clamping device in the at least one locking device.

8. The electrically powered industrial vehicle according to claim 1, wherein the mount is further designed to limit a pivot range of the pivot lever in at least one pivot direction.

9. The electrically powered industrial vehicle according to claim 1, wherein the battery box is open on both sides for removing the battery block in the width direction of the vehicle, and a respective strut and at least one respective locking device are provided at each of a first opening and second opening.

10. The electrically powered industrial vehicle according to claim 1, wherein rollers on which the battery block rests are further provided on a bottom surface of the battery box.

11. The electrically powered industrial vehicle according to claim 1, further comprising at least one removable cover element, which defines an opening of the battery box in the width direction of the vehicle, the at least one locking device being arranged within the at least one removable cover element.

12. The electrically powered industrial vehicle according to claim 1, wherein, in the at least one locking device, the pivot lever is pivotally mounted on the pivot shaft via a threaded attachment so that, in a travel mode, any adjustments to a clamping region in the width direction can be compensated for by the pivot lever pivoting downwards under an effect of gravity.

13. The electrically powered industrial vehicle according to claim 1, wherein the electrically powered industrial vehicle is a narrow aisle forklift truck.

* * * * *